(12) United States Patent
Ota

(10) Patent No.: US 7,619,696 B2
(45) Date of Patent: Nov. 17, 2009

(54) LIQUID CRYSTAL DISPLAY PANEL

(75) Inventor: Akio Ota, Tottori (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 175 days.

(21) Appl. No.: 11/902,831

(22) Filed: Sep. 26, 2007

(65) Prior Publication Data

US 2008/0079859 A1 Apr. 3, 2008

(30) Foreign Application Priority Data

Sep. 28, 2006 (JP) ............................. 2006-264485

(51) Int. Cl.
  *G02F 1/1368* (2006.01)
  *G02F 1/133* (2006.01)
(52) U.S. Cl. ..................... 349/40; 257/355; 361/91.1
(58) Field of Classification Search ............... 349/40, 349/54, 55, 139, 143; 257/355; 361/56, 361/91.1, 91.5, 93.9
See application file for complete search history.

(56) References Cited

U.S. PATENT DOCUMENTS 5,909,035 A * 6/1999 Kim ............................ 257/59
6,573,957 B1 * 6/2003 Suzuki ........................ 349/73
2002/0021375 A1 * 2/2002 Nakajima et al. ............ 349/40
2003/0020845 A1 * 1/2003 Lee et al. .................... 349/40

FOREIGN PATENT DOCUMENTS

| JP | 63-10558 A | 1/1988 |
| JP | 02-068522 A | 3/1990 |
| JP | 10-010493 A | 1/1998 |
| JP | 10-303431 A | 11/1998 |
| JP | 2005-275004 A | 10/2005 |

* cited by examiner

*Primary Examiner*—Dung Nguyen
*Assistant Examiner*—Tai Duong
(74) *Attorney, Agent, or Firm*—Westerman, Hattori, Daniels & Adrian, LLP.

(57) ABSTRACT

In an active matrix type liquid crystal display panel of the invention, an inner shorting line that is thicker than the scan lines and picture lines is disposed so as to surround the periphery of a display area included in the liquid crystal display panel; the scan lines are each connected to first electrostatic prevention circuits and bundled by a first shorting wire; the first shorting wire is connected to the inner shorting line via at least one among second electrostatic prevention circuits; a common potential line that is thicker than the inner shorting line is disposed around the outer periphery of the inner shorting line; and at least one connection is provided between the inner shorting line and common potential line, electrically connecting each to the other.

9 Claims, 10 Drawing Sheets

FIG.2
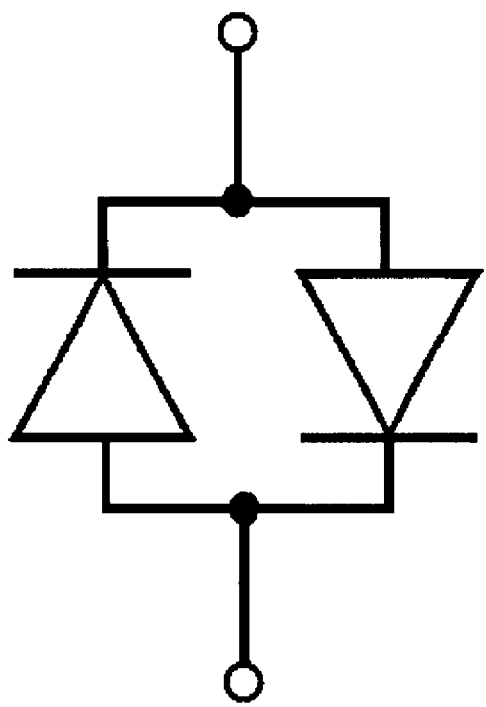
FIG.2A
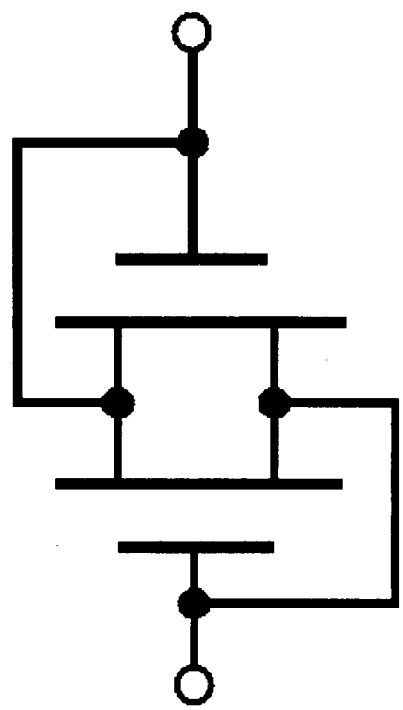
FIG.2B (prior art)

(prior art)

(prior art)

(prior art)

LIQUID CRYSTAL DISPLAY PANEL

BACKGROUND

1. Technical Field

The present invention relates to a liquid crystal display panel with protective circuits that prevent breakage of active elements due to electrostatic during the manufacture process, and more particularly to a liquid crystal display panel with protective circuits that has low power consumption and good display quality.

2. Related Art

There is a simple matrix type of liquid crystal display panel and an active matrix type. However, in the simple matrix type items with the progression to high-definition liquid crystal display panels there has arisen a deterioration of the picture contrast, due to the occurrence of crosstalk. To prevent this, widespread use is now made of active matrix type liquid crystal display panels that are provided with a switching element such as a thin film transistor (TFT) or thin film diode in each individual pixel.

Active matrix type liquid crystal display panels with such structure have come to be manufactured in sizes ranging from small-sized items for mobile telephones to large items of diagonal size 50 inches (approximately 125 cm) to 60 inches (approximately 152 cm) or so. However, if electrostatic penetrates into the display area of liquid crystal display panels during the manufacturing process, resulting in short-circuiting, etc., of the wiring, there will be danger that line defects and point defects will occur in the display screen of the finished liquid crystal display panels, which will have large impacts on the production yield of liquid crystal display panels.

Electrostatic will occur simply through contact with some other thing, either in the manufacturing process or during conveying of the panels. For instance, in the course of processing of a liquid crystal display panel, which involves placing the array substrate, with TFTs and so forth formed thereon, on an exposure stage and implementing specific processes including exposure to light, electrostatic charging will occur when the array substrate is positioned on the exposure stage, because of friction between the array substrate, which is constituted of glass, and the exposure stage. Also, peel-off charging will occur when the array substrate is moved off the exposure stage by the conveying means after the light exposure has finished.

As the electrostatic builds up, electrostatic damage such as breakage of the TFTs formed on the substrate, and short-circuits caused between wiring lines, will occur. Electrostatic is most liable to be generated by the friction during rubbing of the alignment layer. Particularly in small- and medium-sized equipment, electrostatic faults will be more liable to occur than previously as the progression to higher definitions advances. Thus, in the field of liquid crystal display panel manufacturing technology it is an urgent task to prevent the occurrence of display defects due to electrostatic.

One measure for preventing electrostatic damage to the array substrate that has been taken in the related art is to provide around the outer periphery of the wiring lines of the liquid crystal display an outer shorting ring, which is subsequently severed from the wiring lines, and to connect the various wiring lines to the outer shorting ring so that electrostatic is dispersed among the wiring lines, thus alleviating the voltage that is generated between scan lines and picture lines.

However, the outer shorting ring is severed during the substrate cutting process, and no measure for preventing electrostatic damage to the array substrate of the liquid crystal display panel after severing of the outer shorting ring is provided. Thus, antistatic measures for after severing of the outer shorting ring are a problem. Accordingly, a liquid crystal display panel 50 shown in FIG. 7 has been proposed (see JP-A-63-10558), in which, as an antistatic measure for after severing of the outer shorting ring, an inner shorting ring E is provided and scan lines X and picture lines Y are each connected to the inner shorting line E via electrostatic protection circuits constituted of protective transistors TFT1 to TFT4.

A liquid crystal display panel 60 has also been proposed (see JP-A-10-303431), in which, as shown in FIG. 8, the scan lines X and picture lines Y are each connected to separate shorting wires 63, 64 via separate electrostatic protection circuits 61, 62, and are each further connected to separate shorting bars 65, 66, with a lowest level voltage Vg1 of the voltage applied to the scan lines being applied to the scan line shorting wire 63, and a stable, common voltage Vcom being applied to the picture line shorting wire 64.

However, with the invention disclosed in JP-A-63-10558 there has been a problem of high power consumption, because the wiring lines that are connected to the ground line are also, connected to the inner shorting ring E via the protective transistors TFT1 to TFT4, due to the electrostatic damage countermeasure, and therefore current unavoidably flows between the ground line and each scan line X and picture line Y.

Also, with the invention disclosed in JP-A-10-303431, the scan lines X and picture lines Y are each doubly connected—on the inner side to the shorting wires 63, 64 via the electrostatic prevention circuits 61, 62 and on the outer side to the shorting bars 65, 66—but there is still the problem that after the outer shorting bars 65, 66 have been severed, the power consumption is high due to leakage current.

Moreover when, as another electrostatic damage countermeasure, the present inventors formed the inner shorting ring, connected the scan lines and picture lines thereto separately via protective circuits, and connected such to a common potential line formed on the array side of the array substrate, the same problem of high power consumption occurred as in the liquid crystal display panel 50 or 60 of the related art described above. Such common potential line potential had the same potential as that applied to the color filter substrate's common electrodes, and was connected to the common electrodes in the four corners of the substrate.

The cause of the high power consumption is, according to the findings of investigations by the present inventors, as follows. Each of the wiring lines connected to the common electrodes is also connected to the inner shorting ring via transistors, as an electrostatic damage countermeasure. But if the wires are connected to the common potential line via transistors, as an electrostatic damage countermeasure, then, as is evident from the voltage waveform diagram shown in FIG. 9 for when the liquid crystal display panel is driven, a voltage Voff will be permanently applied to the scan lines even when scanning is not performed, while when scanning is performed, a voltage Von will be applied thereto, so that there will be large potential difference between the voltages applied to the common potential line and the scan lines, with the result that current will flow between the common potential line and the scan lines, in particular. This current results in the high power consumption.

Accordingly the present inventors pursued many and various investigations in order to solve the foregoing problem of high power consumption in liquid crystal display panels provided with electrostatic damage prevention circuits, and as a result discovered that by bundling with a shorting wire the scan lines and the picture lines, respectively, which are connected to transistors as an electrostatic damage countermeasure, and then connecting to the inner shorting ring, via transistors, each line bundle bundled by the shorting wires, it is possible to curb the leakage current that arises between these lines and the inner shorting ring, and thereby to provide a liquid crystal display panel with low power consumption, as has already been disclosed in JP-A-2005-275004.

A liquid crystal display panel 10B that is disclosed in JP-A-2005-275004 will now be described using FIG. 10. In this liquid crystal display panel 10B, each area enclosed by the scan lines 11 and picture lines 12, which are arrayed as a matrix, is a pixel area, and in each pixel area there is formed, say, a TFT 13 or thin film diode serving as switching element, and a pixel electrode 14. In FIG. 10 the gate electrode, drain electrode and source electrode of the TFTs 13, which are the switching elements, are connected to a scan line 11, picture line 12 and pixel electrode 14 respectively. With such configuration, when scan signals are supplied to the scan lines 11, the TFTs 13 are put into the ON state, and picture signals from the picture lines 12 are supplied to the pixel electrodes 14 via the TFTs 13, which are in the ON state.

In the liquid crystal display panel 10B, electrostatic protection circuits $15_1$, $15_2$ are connected to each scan line 11 and each picture line 12, then the scan lines 11 and picture lines 12 are bundled with shorting lines $16_1$ and $16_2$ respectively, and the scan line 11 and picture line 12 bundles bundled by the shorting lines $16_1$ and $16_2$ are connected to a common potential line (that includes ground) 17. Also, other electrostatic protection circuits $18_1$ and $18_2$ are interposed and connected between the shorting lines $16_1$ and $16_2$ bundling the scan lines 11 and picture lines 12 and the common potential line 17. In this case, the common potential line 17 is an electrode provided on the array substrate of the liquid crystal display panel, and at one of the array substrate's four corners is connected to a common electrode of the color filter substrate.

Further, although this liquid crystal display panel 10B represents an example where, for the first electrostatic protection circuits $15_1$, $15_2$ and second electrostatic protection circuits $18_1$, $18_2$, use is made of a pair of diodes connected in parallel, with the anode of each connected to the cathode of the other, it would alternatively be possible to use parallel circuits in which a pair of transistors, with short-circuits created between their gates and sources, are connected in opposite orientations to each other.

Even if electrostatic or other high voltage with differing positive/negative polarity is applied to the electrostatic protection circuits $15_1$, $15_2$, $18_1$, $18_2$, one of the diodes thereof, or else one of the protective transistors that turn on with positive bias or one of the protective transistors that turn on with negative bias, will be put into the ON state and the high voltage will be conducted into the common potential, so that the TFTs serving as active elements will be protected and electrostatic damage will be prevented.

Moreover, before testing of the array substrate, short circuits are normally created between the various wiring lines by the outer shorting ring (not shown in the drawing), and thus there is protection against electrostatic. After testing of the array substrate, when the liquid crystal display panel has been severed from the outer shorting ring, occurrence of variation or the like in Vth, the threshold level for TFT 13 voltage due to electrostatic, will be prevented by the duplex electrostatic protection circuits $15_1$, $15_2$ and $18_1$, $18_2$ connected to the shorting lines $16_1$, $16_2$ and the common potential line 17.

As regards power consumption, with the scan lines 11 and picture lines 12 bundled via the first electrostatic protection circuits $15_1$, $15_2$, and moreover connected to the common potential line 17 via the diodes or TFTs of the second duplex electrostatic protection circuits $18_1$, $18_2$, current will not readily flow between each line bundle and the common potential line 17, insofar as the diodes or TFTs of the second duplex electrostatic protection circuits $18_1$, $18_2$ are interposed therebetween. Thanks to this, leakage current to the common potential line 17 will be curbed and a low power consumption liquid crystal display panel 10B will be obtained.

The liquid crystal display panel 10B disclosed in JP-A-2005-275004 as described above yields exceedingly outstanding advantages in terms of being strong against electrostatic damage during manufacture and having low power consumption. However, increasingly higher definition than in earlier items is being required of the small-sized liquid crystal display panels of recent years, which are typified by those used in mobile telephones, and to increase the definition of such liquid crystal display panels it is indispensable to render the various wiring line portions narrower so as to render the display aperture larger. But as the progression to higher definition has advanced in the liquid crystal display panels with the electrostatic protection circuits such as described above, flicker has been found to occur.

SUMMARY OF THE INVENTION

The present inventors conducted many and varied investigations into the causes of the occurrence of flicker in the high-definition liquid crystal display panels with the electrostatic protection circuits such as described above, as a result of which they noticed that the potential Vcom of the common electrodes, although slight, varies periodically, and discovered that such periodic variation of Vcom depends on the wiring resistance of the electrostatic protection circuits. More precisely, in earlier liquid crystal display panels for mobile use the number of pixels was low and therefore a certain thickness could be assured for the wiring portions of the electrostatic protection circuits, which meant that the wiring resistance was low and was not observed to affect Vcom. But when the wiring portions of the electrostatic protection circuits became thinner as the definition of the liquid crystal display panels increased, the wiring resistance could no longer be ignored, and the voltage due to the current flowing in those wiring portions exerted effects on Vcom that were observed as flicker.

An advantage of some aspects of the present invention is to provide a liquid crystal display panel of an active matrix type that is equipped with protective circuits against electrostatic damage, wherein power consumption is low, there is little occurrence of flicker, and the display quality is good.

According to an aspect of the invention, a liquid crystal display panel includes an array substrate in which pixels are constituted by disposing a pixel electrode and a TFT in each area enclosed by scan lines and picture lines arrayed as a matrix, and a color filter substrate equipped with a common electrode. The liquid crystal display panel has the innovative features that: an inner shorting line that is thicker than the scan lines and picture lines is disposed so as to surround the periphery of a display area included in the liquid crystal display panel; the scan lines are each connected to first electrostatic prevention circuits, and bundled by a first shorting wire; the first shorting wire is connected to the inner shorting line via at least one among second electrostatic prevention circuits; a common potential line that is thicker than the inner shorting line is disposed around the outer periphery of the inner shorting line; and at least one connection is provided between the inner shorting line and common potential line, electrically connecting each to the other.

Also, in the above liquid crystal display panel, the picture lines may each be connected to third electrostatic prevention circuits and moreover be bundled by a second shorting wire, with the second shorting wire being connected to the inner shorting line via fourth electrostatic prevention circuits.

Also, in the above liquid crystal display panel, the first to fourth electrostatic prevention circuits may each be composed of a pair of diodes connected in parallel with the anode of each connected to the cathode of the other, or else be composed of parallel circuits in which a pair of transistors with short circuits created between the gates and sources thereof are connected in opposite orientations to each other.

According to another aspect of the invention, a liquid crystal display panel includes an array substrate in which pixels are constituted by disposing a pixel electrode and a TFT in each area enclosed by scan lines and picture lines arrayed as a matrix, and a color filter substrate equipped with a common electrode. The liquid crystal display panel has the innovative features that: an inner shorting line that is thicker than the scan lines and picture lines is disposed so as to surround the periphery of a display area included in the liquid crystal display panel; the scan lines are each connected to first electrostatic prevention circuits and are bundled by a first shorting wire; the first shorting wire is connected to the inner shorting line via at least one among second electrostatic prevention circuits; a common potential line that is thicker than the inner shorting line is disposed around the outer periphery of the inner shorting line; on an insulator provided over the inner shorting line at least one group of multiple contact holes parallel with the common potential line is provided; on an insulator provided over the common potential line at least one group of multiple contact holes parallel with the inner shorting line is provided; and the inner shorting line and common potential lines are electrically connected to each other by the contact holes and by conductive films provided over the insulators.

Also, in the above liquid crystal display panel, the contact holes may take the form of slits that extend in parallel with the inner shorting line or common potential line.

Also, in the above liquid crystal display panel, the picture lines may each be connected to third electrostatic protection circuits, and moreover be bundled by a second shorting wire, with the second shorting wire being connected to the inner shorting line via fourth electrostatic prevention circuits.

Also, in the above liquid crystal display panel, the first to fourth electrostatic prevention circuits may each be composed of a pair of diodes connected in parallel with the anode of each connected to the cathode of the other, or else be composed of parallel circuits in which a pair of transistors with short circuits created between the gates and sources thereof are connected in opposite orientations to each other.

According to some aspects of the liquid crystal display panel of the invention, insofar as there are two sets of electrostatic protection circuits, the current that flows from the scan lines to the common potential lines will be small even if the voltage applied to the scan lines varies markedly, and thus a liquid crystal display panel is obtained in which power consumption is low. In addition, the thickness of the inner shorting line is greater than that of the scan lines and picture lines, and the thickness of the common potential line is greater than that of the inner shorting line; consequently, even if current from the individual scan lines should concentrate in the inner shorting line through the electrostatic protection circuits, the voltage fall in the inner shorting line will be small, and likewise, even if current from the inner shorting line should concentrate in the common potential line through the multiple electrostatic protection circuits, the voltage fall in the common potential line will be small. This means that a liquid crystal display panel is obtained in which periodic variation is small, there is little flicker, and the display quality is good.

According to some aspects of the liquid crystal display panel of the invention, the picture lines, like the scan lines, are connected to the common potential line via two sets of electrostatic protection circuits and an inner shorting line, so that a liquid crystal display panel is obtained in which power consumption is even lower, and moreover there is little flicker and the display quality is good.

According to some aspects of the liquid crystal display panel of the invention, should electrostatic or other high voltage with differing positive/negative polarity be applied to the electrostatic protection circuits, one of the diodes or transistors thereof will be put into the ON state and the high voltage will be conducted into the common potential, so that a liquid crystal display panel can be provided that is strong against electrostatic damage while having a simple configuration, and moreover that has low power consumption.

According to some aspects of the liquid crystal display panel of the invention, at least one group of multiple contact holes in parallel with the common potential line is provided on an insulator provided over the inner shorting line; at least one group of multiple contact holes in parallel with the inner shorting line is provided on an insulator provided over the common potential line; and the inner shorting line and common potential line are electrically connected to each other by the contact holes and by conductive films provided over the insulators; thanks to which, in addition to the foregoing advantages of the invention, a large distance can be placed between the inner shorting line and common potential line, and furthermore, the area of contacting between the conductive films on the one hand, and the shorting wires and common potential line on the other, can be rendered large, which means that the electrical resistance between the inner shorting line and the common potential line can be rendered low. Hence, there will be little occurrence of flicker due to electrical resistance between the inner shorting line and the common potential line, the display quality will be good, and what is more, electrostatic damage will be unlikely to occur between the inner shorting line and the common potential line even if large current should flow due to electrostatic.

According to some aspects of the invention, the contact holes take the form of slits that extend in parallel with the inner shorting line or common potential line, thanks to which the area of contacting between the conductive films on the one hand, and the shorting wires and common potential line on the other, can be rendered larger, so that the foregoing advantages of the invention will be heightened.

BRIEF DESCRIPTION OF THE DRAWINGS

The invention will be described with reference to the accompanying drawings, wherein like numerals refer to like elements throughout.

FIGS. 2A and 2B are circuit diagrams each illustrating a specific instance of an electrostatic protection circuit.

DETAILED DESCRIPTION OF THE INVENTION

Figure 1:
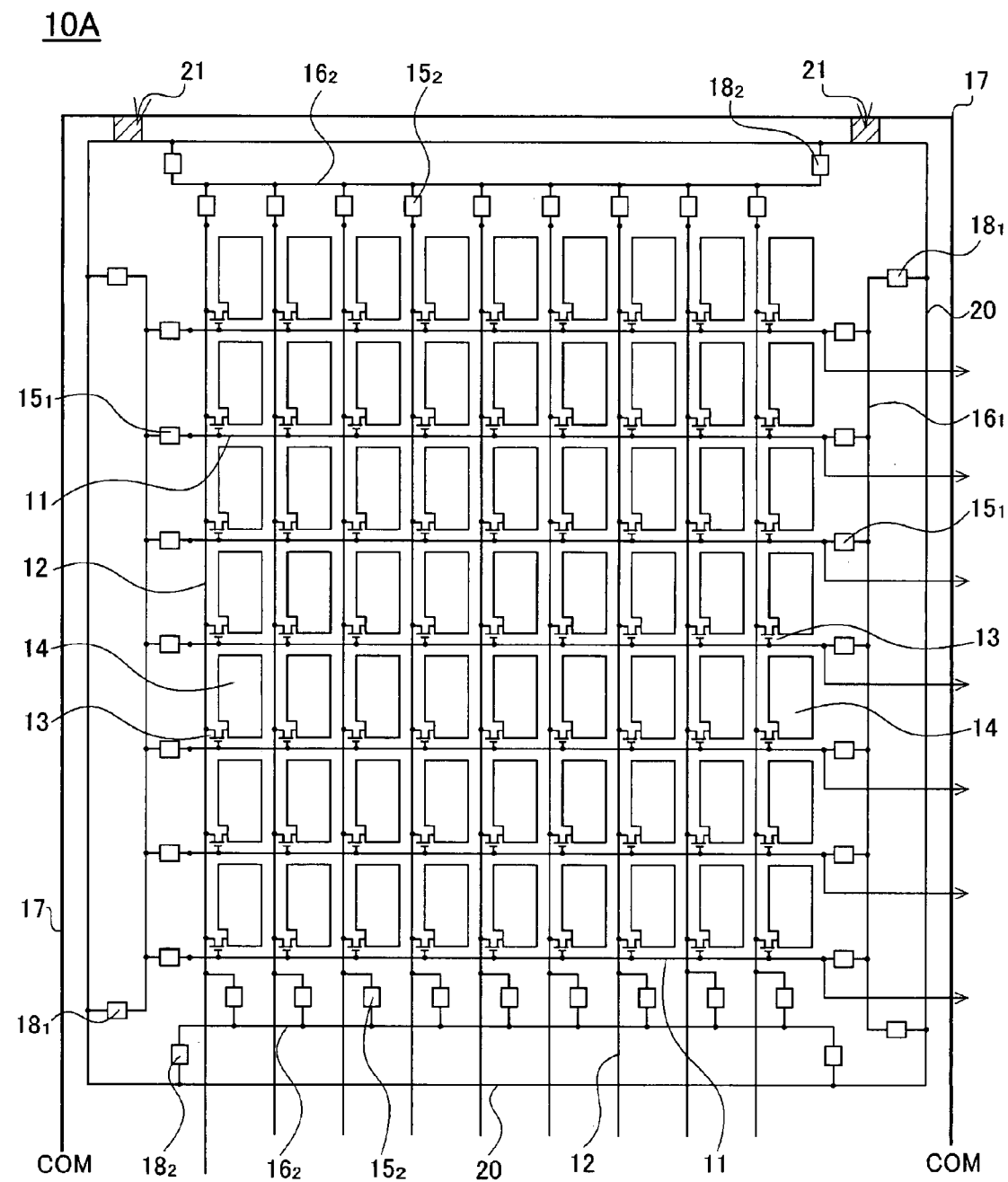
FIG. 1 is a schematic equivalent circuit diagram of a liquid crystal display panel of an embodiment of the present invention.
Figure 10:
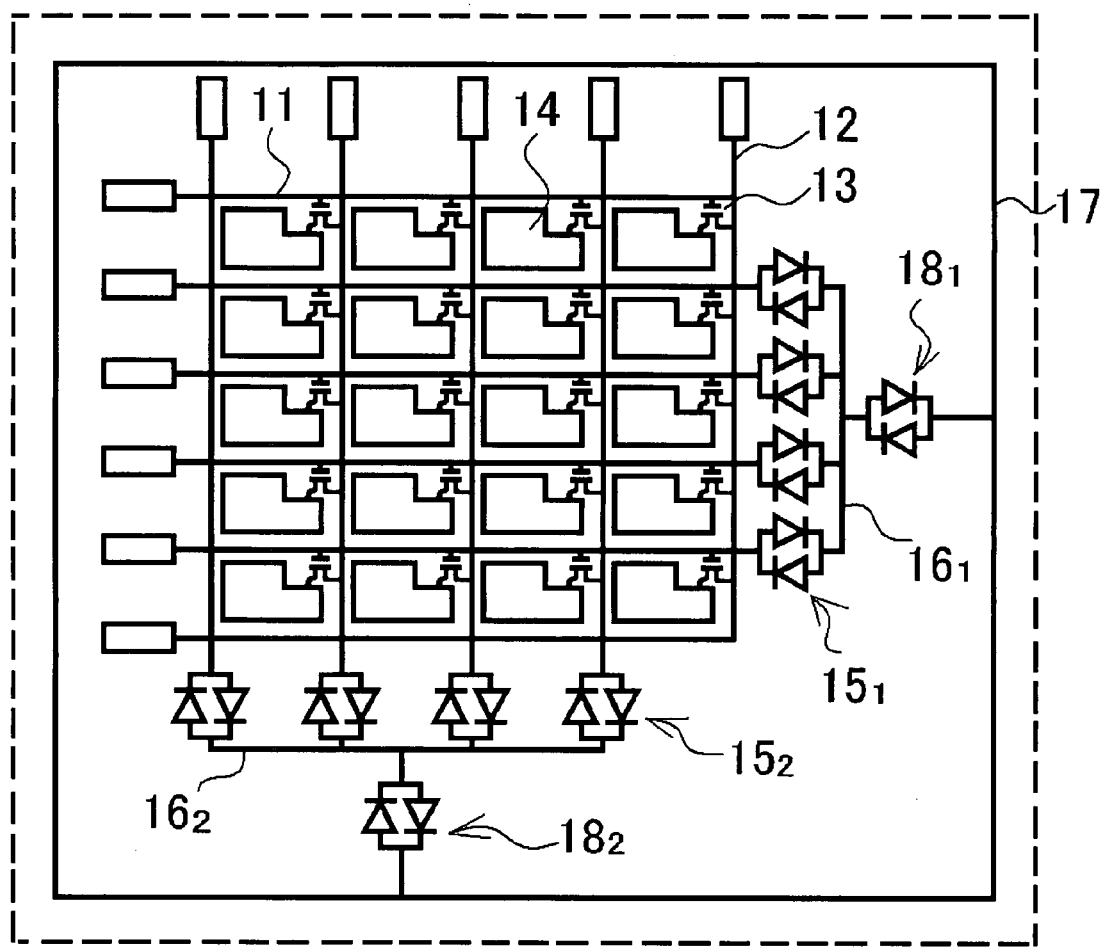
FIG. 10 is a schematic equivalent circuit diagram of a third instance of a liquid crystal display panel of the related art.

An exemplary embodiment of the present invention will now be described with reference to the accompanying drawings of a liquid crystal display panel 10A of the invention. It should be understood however that such description is presented here by way of an example for realizing the technical concepts of the present invention, not by way of limiting the invention to this particular embodiment. It will be obvious to those skilled in the art that many different variations upon the embodiment can be practiced without departing from the intent and purpose of the invention, which can be applied equally well to such variations. FIG. 1 is a schematic equivalent circuit diagram of a liquid crystal display panel 10A of an embodiment of the present invention. In the description that follows, those component elements that are identical with those in the liquid crystal display panel 10B of the related art shown in FIG. 10 are assigned the identical reference numerals.

In the active matrix type liquid crystal display panel 10A of this embodiment, two substrates constituted of glass or the like are placed opposing each other with a liquid crystal layer interposed, and on the liquid crystal layer side surface of one of the substrates there are formed multiple scan lines that extend in the X direction thereof and are provided in rows laid in the Y direction, together with multiple picture lines that are insulated from the scan lines, extend in the Y direction, and are provided in rows laid in the X direction.

As FIG. 1 shows, in the liquid crystal display device 10A, each area enclosed by the scan lines 11 and picture lines 12, which are arrayed as a matrix, constitutes a pixel area, and in the pixel areas there are formed a TFT 13 serving as switching element and a pixel electrode 14. In FIG. 1, the gate electrode, drain electrode and source electrode of the TFTs 13, which are the switching elements, are connected to a scan line 11, picture line 12 and pixel electrode 14 respectively. With such configuration, when scan signals are supplied to the scan lines 11, the TFTs 13 are put into the ON state, and picture signals from the picture lines 12 are supplied to the pixel electrodes 14 via the TFTs 13, which are in the ON state.

In the liquid crystal display panel 10A, first electrostatic protection circuits $15_1$ are connected to each scan line 11, the scan lines 11 are bundled by a first shorting wire $16_1$, and the first shorting wire $16_1$ is connected to an inner shorting line 20 via at least one or more (in FIG. 1 there are two) second electrostatic protection circuits $18_1$. Likewise, third electrostatic protection circuits $15_2$ are connected to each picture line 12, the picture lines 12 are bundled by a second shorting wire $16_2$, and the second shorting wire $16_2$ is connected to the inner shorting line 20 via one or more (in FIG. 1 there are two) fourth electrostatic protection circuits $18_2$.

The inner shorting line 20 in this example is, since current from the scan lines 11 or picture lines 12 concentrates therein, made to be 10 to 20 μm thick, which is greater than the thickness of the scan lines and picture lines (normally 3 to 8 μm in a small-sized liquid crystal display panel), to lower electrical resistance. The thickness of the first and second shorting wires $16_1$, $16_2$—although it will not much affect the electrostatic protection characteristics as the distance that current flows therein is short—will preferably be the same as that of the inner shorting line 20. The reason why the quantity of second electrostatic protection circuits $18_2$ and fourth electrostatic protection circuits $18_2$ is more than one here is that, although providing the minimum one of each will give a fair degree of electrostatic protection capability, in order to shorten the response time for the electrostatic protection by each, it is better, to provide multiple and dispersed electrostatic protection circuits and thereby shorten the distance that the current due to electrostatic will flow.

The inner shorting line 20 is electrically connected, at connections 21 provided in multiple quantity (two in FIG. 1), to a common potential line 17 provided along the outer periphery of the inner shorting line 20. The position in which such connections 21 are formed and the specific structures thereof will be described hereafter. The thickness of the common potential line 17 is 50 to 200 μm, thicker than the inner shorting line 20. The reason why the common potential line 17 is thus made thicker than the inner shorting line 20 is that the common potential line 17 has also to supply power to the common electrodes of the color filter substrate, and consequently larger current flows therethrough than through the inner shorting line 20.

Thus, with the inner shorting line 20 being thicker than the scan lines 11 and picture lines 12, and the common potential line 17 being thicker than the inner shorting line 20, those wiring lines through which relatively large current flows are the thicker ones, and therefore there will be little variation in the common potential due to the current flowing in these wiring lines. Consequently a liquid crystal panel will be obtained in which occurrence of flicker is reduced and the display quality is good.

The first to fourth electrostatic protection circuits $15_1$, $15_2$, $18_1$ and $18_2$ in the liquid crystal display panel of this embodiment can be composed of a pair of diodes connected in parallel with the anode of each connected to the cathode of the other as shown in FIG. 2A, or else of parallel circuits in which a pair of transistors with short circuits created between the gates and sources thereof are connected in opposite orientations to each other. First to fourth electrostatic protection circuits $15_1$, $15_2$, $18_1$ and $18_2$ formed from such elements can be formed in the same manufacturing process as the TFTs 13 of the matrix array of the liquid crystal display panel 10A, and therefore will not require a special manufacturing process.

Even if electrostatic or other high voltage with differing positive/negative polarity is applied to the first to fourth electrostatic protection circuits $15_1$, $15_2$, $18_1$ and $18_2$, one of the diodes thereof, or else one of the protective transistors that turn on with positive bias or one of the protective transistors that turn on with negative bias, thereof, will be put into the ON state, so that the high voltage is conducted to ground; thanks to which, the TFTs 13 serving as active elements will be protected, and furthermore, short-circuiting between the intersecting wiring lines, and electrostatic damage to the liquid crystal display panel 10A, will be prevented.

Also, before testing of the array substrate, short circuits are created between the various wiring lines by the outer shorting ring (not shown in the drawing), and thus there is protection from electrostatic. After testing of the array substrate, when the liquid crystal display panel has been severed from the outer shorting ring, occurrence of variation or the like in Vth, the threshold level for TFT 13 voltage due to electrostatic, will be prevented by the duplex electrostatic protection circuits $15_1$, $15_2$ and $18_1$, $18_2$ connected to the shorting lines $16_1$, $16_2$ and the common potential line 17.

As regards power consumption, with the scan lines 11 and picture lines 12 each bundled and connected to the common potential line 17 via the diodes or TFTs of the second electrostatic protection circuits $18_1$, $18_2$, current will not readily flow between each line bundle and the common potential line 17, insofar as the diodes or TFTs are interposed therebetween. Thereby, leakage current to the common potential line 17 will be curbed and a low power consumption liquid crystal display panel will be obtained.

Further, if either the scan lines 11 only or the picture lines 12 only are connected to the inner shorting line 20 via the second electrostatic protection circuits $18_1$ or the fourth electrostatic protection circuits $18_2$, then the voltage applied to the scan lines 11 will be large compared to the voltage applied to the picture lines 12. As a result, the current that flows from the scan lines 11 to the common potential line 17 via the inner shorting line 20 will be large, and connecting the scan lines 11 to the second electrostatic protection circuits $18_1$ will have the greater power consumption-reducing effect. Hence, with the present invention it will be necessary to connect at least the scan lines 11 to the inner shorting line 20 via the second electrostatic protection circuits $18_1$. Note that the common potential mentioned above is common potential that includes ground.

Next will be described the connections 21 employed between the inner shorting line 20 and common potential line 17 in the present embodiment. Since the various wiring lines in the liquid crystal display panel 10A are formed simultaneously with formation of the TFTs 13 thereof, there exist parts of the TFTs that are formed simultaneously with formation of the scan lines and gate electrodes (such wiring parts are termed "gate wiring parts" below), and parts that are formed simultaneously with formation of the picture lines and source electrodes (such wiring parts are termed "source wiring parts" below). Further, insulators that are the same as the gate insulators of the TFTs 13 are present between the gate wiring parts and source wiring parts, and also, protective insulators are present on the surfaces of the source wiring parts.

Figure 3:
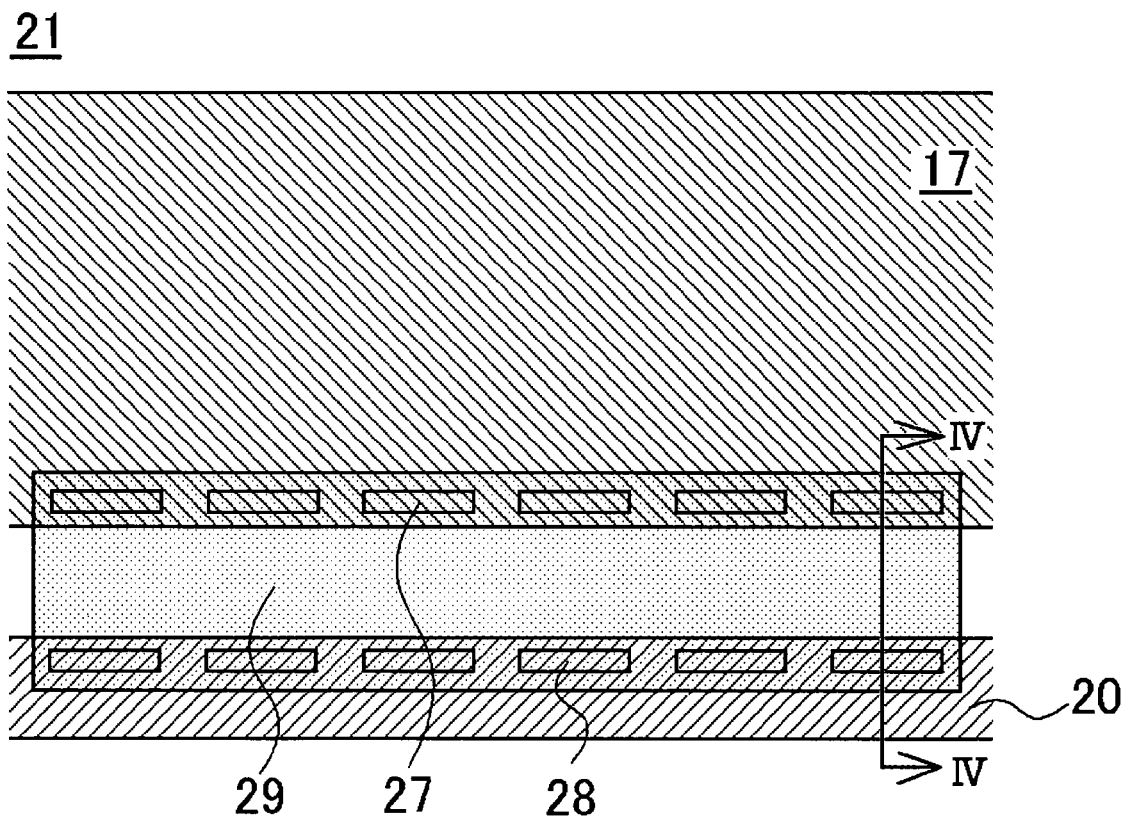
FIG. 3 is an enlarged top view of a connection portion of the embodiment.
Figure 4:
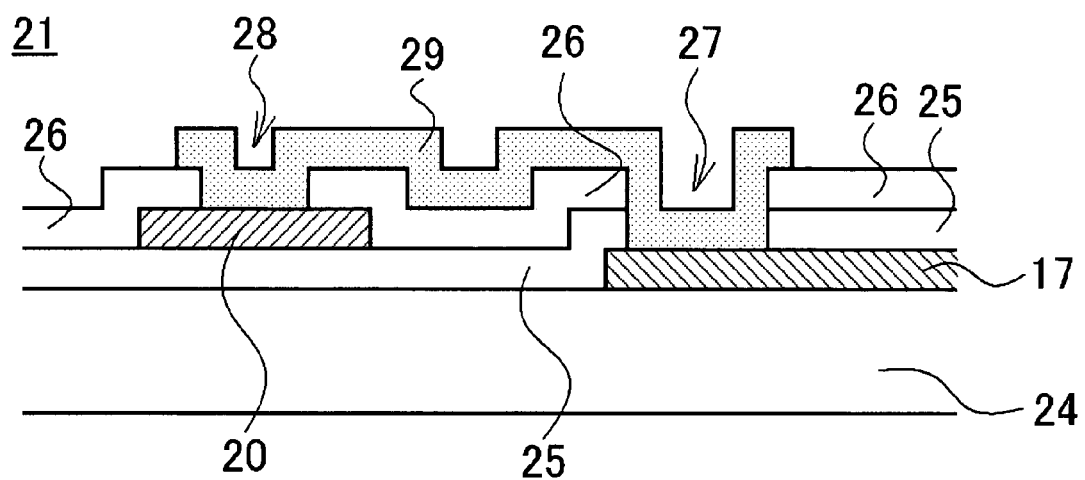
FIG. 4 is a cross-sectional view along line IV-IV in FIG. 3.

Therefore, as FIG. 4 shows, in the liquid crystal display panel 10A of the present embodiment, the common potential line 17 is formed as a gate wiring part on a surface of a transparent substrate 24 that constitutes the array substrate, the inner shorting line 20 is formed as a source wiring part over a gate insulator 25 that covers the surface of the common potential line 17, and furthermore the surfaces of the inner shorting line 20 and gate insulator 25 are covered with a protective insulator 26. FIG. 4 is a cross-sectional view along line IV-IV in FIG. 3, which is a top view of the connections 21 in the present embodiment; the structure shown in FIG. 3 will be described hereafter.

Accordingly, in the liquid crystal display panel 10A of the present embodiment, the connections 21 are formed by forming contact holes 27 and 28 in the gate insulator 25 and protective insulator 26 respectively, and forming a conductive film 29 inside the contact holes 27 and 28 and on the surface of the protective insulator 26, thereby effecting electrical continuity. The conductive film 29 can be formed simultaneously with formation of pixel electrodes 14 of the liquid crystal display panel 10 which are constituted of indium tin oxide (ITO) or the like.

Figure 5:
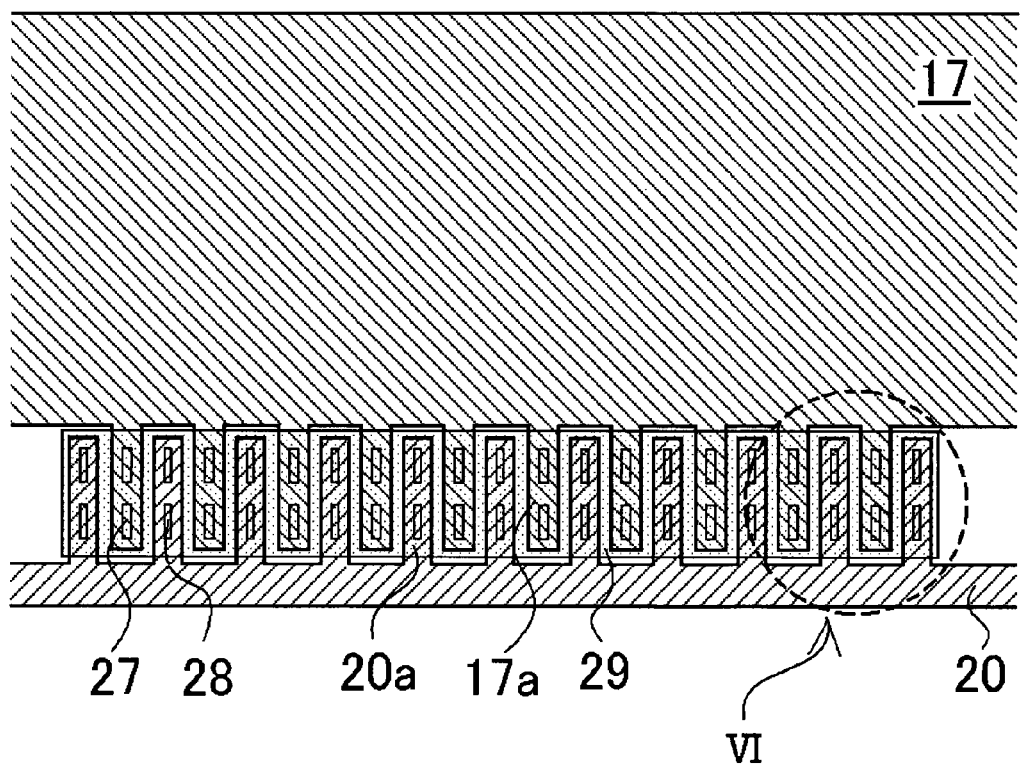
FIG. 5 is an enlarged top view of an electrical connection between two wiring lines via contact holes of the related art.
Figure 6:
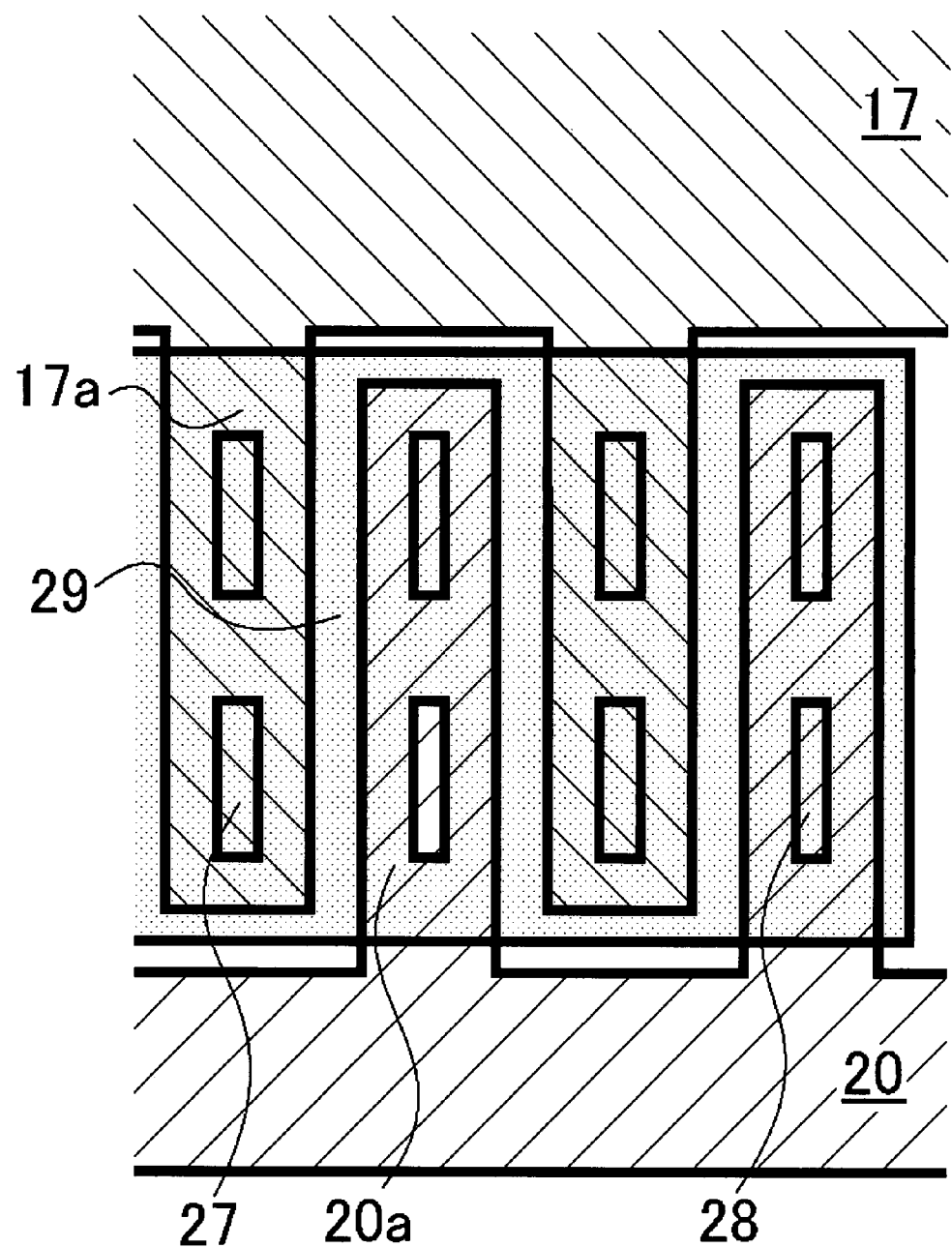
FIG. 6 is an enlarged view of portion VI in FIG. 5.
Figure 7:
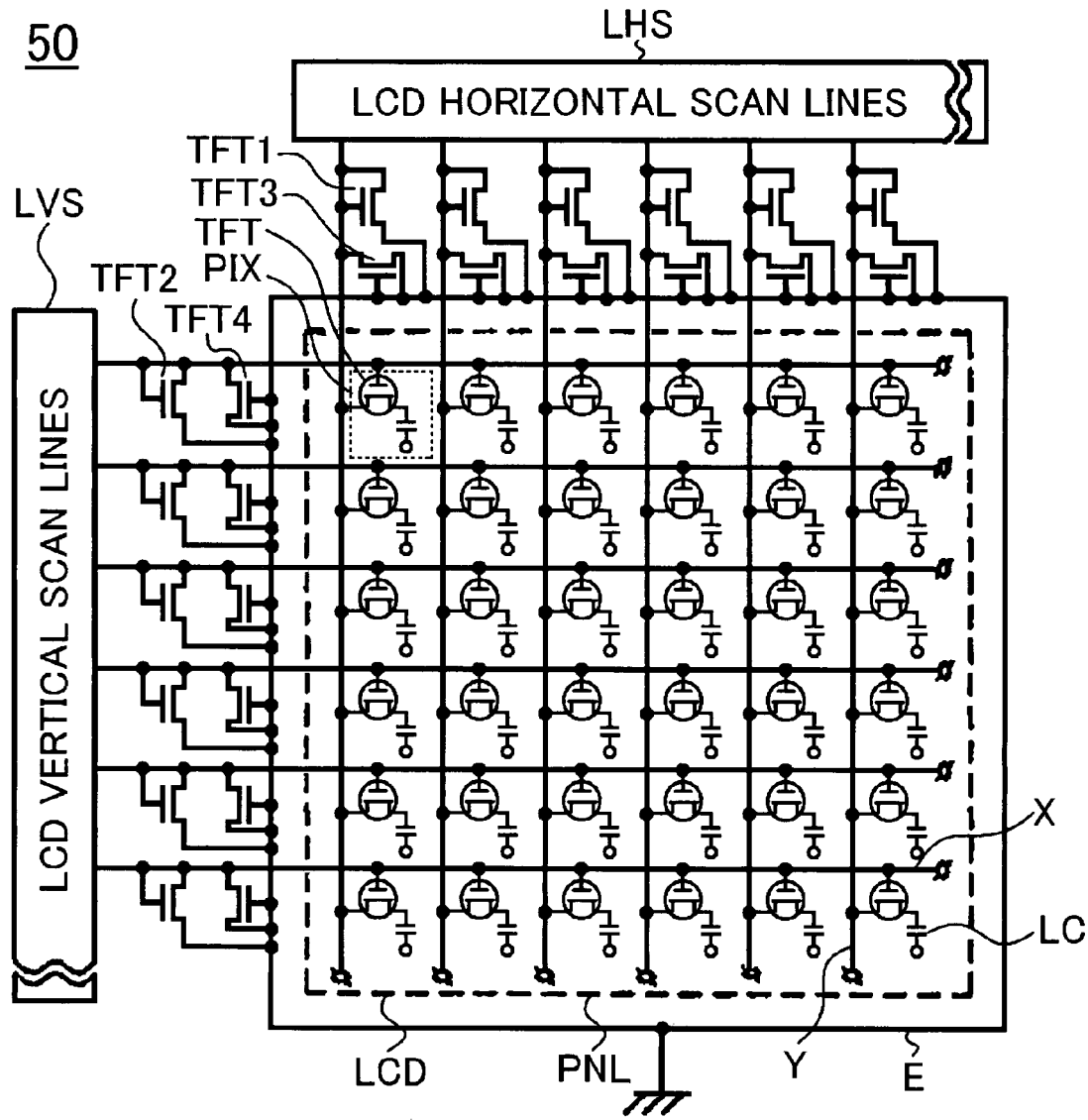
FIG. 7 is a schematic equivalent circuit diagram of a first instance of a liquid crystal display panel of the related art.
Figure 8:
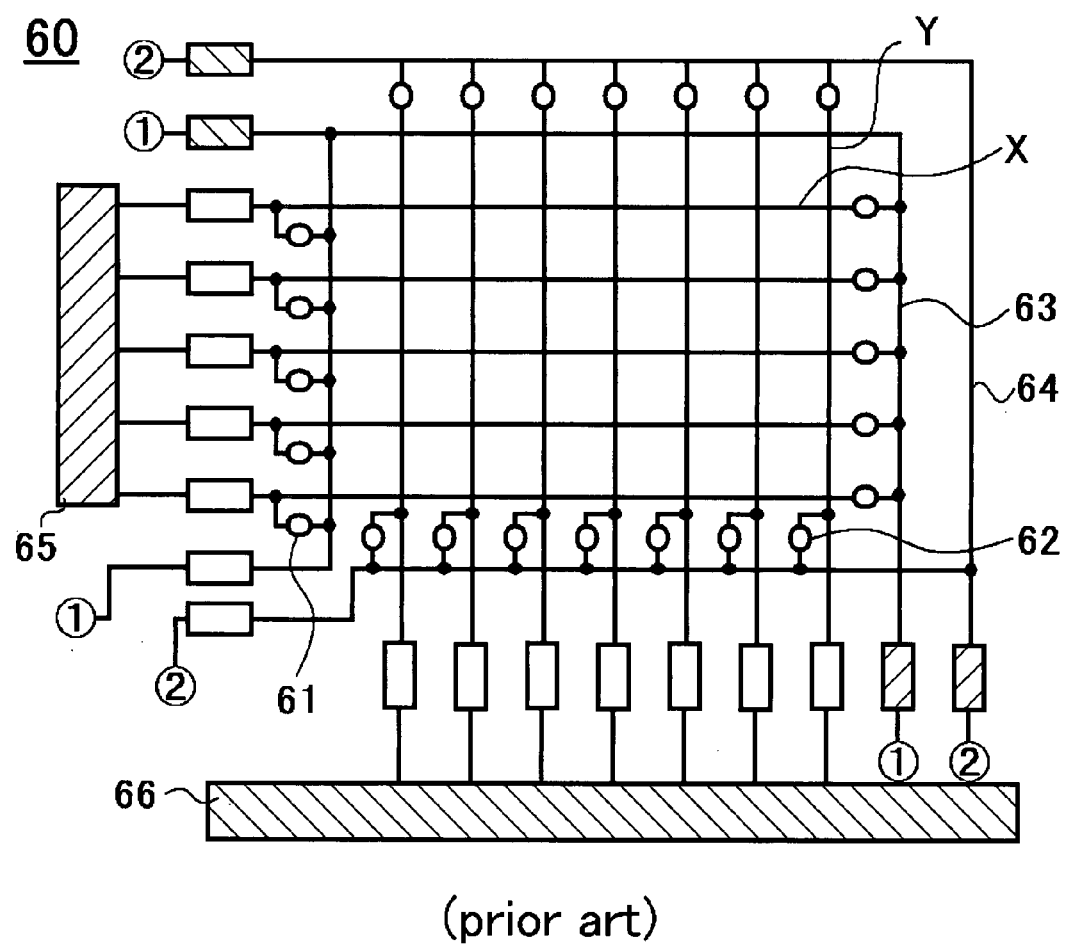
FIG. 8 is a schematic equivalent circuit diagram of a second instance of a liquid crystal display panel of the related art.
Figure 9:
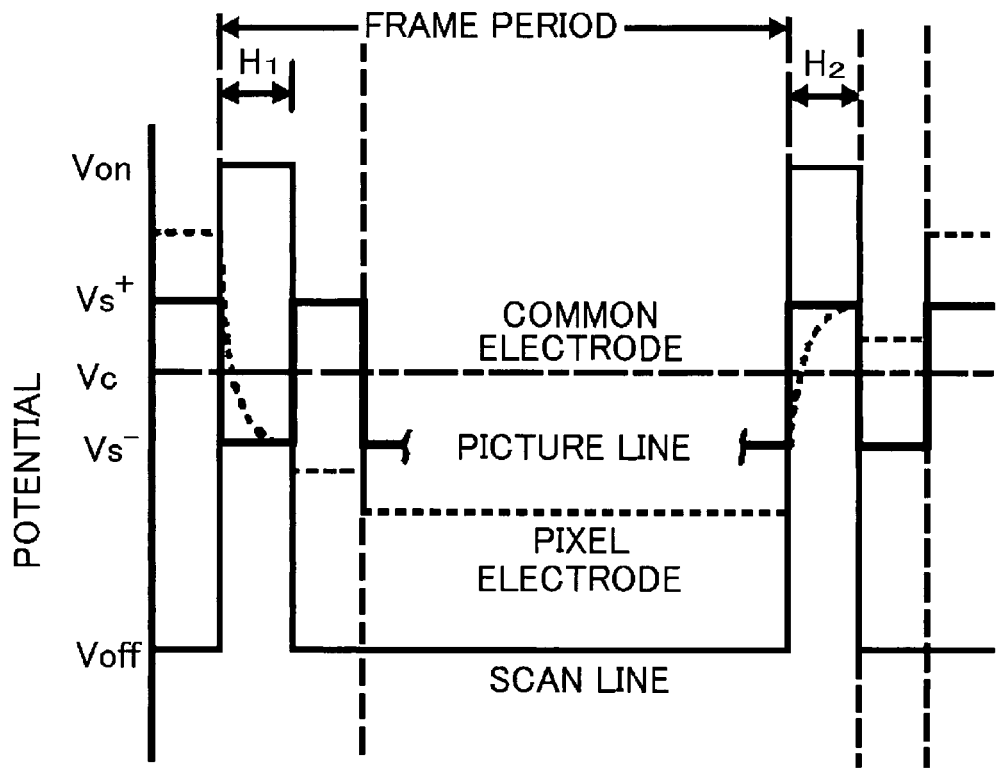
FIG. 9 is a diagram showing the voltage waveforms for various elements when the liquid crystal display panel is driven.

Such structure—a conductive connection between two wiring parts via contact holes formed in an insulator—is well known, and a structure such as shown in FIGS. 5 and 6 is commonly employed in order to render small the connection resistance, and enable large current to flow, between two wiring lines. FIG. 5 is an enlarged top view of an electrical connection between wiring lines via contact holes of the related art, and FIG. 6 is an enlarged view of portion VI in FIG. 5.

The structure shown in FIGS. 5 and 6 will now be described as if employed for the conductive connection structure between the common potential line 17 and the inner shorting line 20. The conductive connection would then have a structure such that; on the side of the common potential line 17 that is opposed to the inner shorting line 20 there are provided comb tooth-like portions 17a, likewise on the side of the inner shorting line 20 that is opposed to the common potential line 17 there are provided comb tooth-like portions 20a, these comb tooth-like portions 17a and 20a are made to engage into each other so as to leave just an equal distance (say 3 µm) therebetween, contact holes 27, 28 are formed in the comb tooth-like portions 17a and 20a, and a conductive film 29 is formed along the surface thereof.

However, when the present inventors employed such comb tooth-like structure as a preparatory experiment, sparks occurred in the comb tooth-like portions 17a and 20a during the electrostatic damage test, and short-circuits that penetrated through the insulator were observed, along with disconnections. The cause was inferred to be that as the spacing between the comb tooth-like portions 17a and 20a was narrow to begin with, being 3 µm or so, there occurred places where the spacing between the comb tooth-like portions 17a and 20a became still narrower, due to mask misalignment or like factors during manufacture, and this resulted in dielectric breakdown at such narrowed portions of the spacing during the electrostatic damage test.

Accordingly, in the liquid crystal display panel 10A of the present embodiment, a structure having comb tooth-like portions such as described above is not employed for the conductive connections between the common potential line 17 and inner shorting line 20. Instead, the structure of the connection 21 shown in FIG. 3 is employed. FIG. 3 is an enlarged top view of the connection 21 employed in the embodiment.

The connections 21 employed in the embodiment are so structured that at least one group of multiple slit-form contact holes 27 parallel with the inner shorting line 20 is provided in the insulator provided over the common potential line 17, similarly at least one group of multiple slit-form contact holes 28 parallel with the common potential line 17 is provided in the insulator provided over the inner shorting line 20, and the inner shorting line 20 and common potential line 17 are electrically connected to each other via the contact holes 27, 28 and the conductive film 29 provided over the insulators.

Adopting such structure for the structure of the connections 21 enables the spacing between the common potential line 17 and inner shorting line 20 to be made larger—say 5 to 10 µm—and enables the contacting area between the conductive film 29 and the common potential line 17 or inner shorting line 20 to be rendered larger, due to contact holes 27 and 28 are formed as the slit-form, and thereby the electrical resistance between the common potential line 17 and inner shorting line 20 can be rendered lower. Consequently, even if electrostatic should occur during the manufacturing process, there will be no occurrence of sparks such as there would be if the structure with comb tooth-like portions shown in FIGS. 5 and 6 were employed for the structure of the conductive connections between the common potential line 17 and inner shorting line 20, and it will be possible to manufacture liquid crystal panels with good production yield.

What is claimed is:

1. A liquid crystal display panel, comprising:
an array substrate in which pixels are constituted by disposing a pixel electrode and a thin film transistor in each area enclosed by scan lines and picture lines arrayed as a matrix, and
a color filter substrate equipped with a common electrode;
wherein an inner shorting line that is thicker than the scan lines and picture lines is disposed so as to surround the periphery of a display area included in the liquid crystal display panel,
wherein the scan lines are each connected to first electrostatic prevention circuits and are bundled by a first shorting wire,
wherein the first shorting wire is connected to the inner shorting line via at least one second electrostatic prevention circuit,
wherein a common potential line that is thicker than the inner shorting line is disposed around the outer periphery of the inner shorting line, and
wherein at least one connection is provided between the inner shorting line and the common potential line, electrically connecting the inner shorting line and the common potential line.

2. The liquid crystal display panel according to claim 1, wherein the picture lines are each connected to third electrostatic prevention circuits and are bundled by a second shorting wire, the second shorting wire being connected to the inner shorting line via fourth electrostatic prevention circuits.

3. The liquid crystal display panel according to claim 1, wherein the first and second electrostatic prevention circuits each include a pair of diodes connected in parallel with an anode of each connected to a cathode of the other, or each include parallel circuits in which a pair of transistors with short circuits created between gates and sources thereof are connected in opposite orientations to each other.

4. The liquid crystal display panel according to claim 2, wherein the third and fourth electrostatic prevention circuits each include a pair of diodes connected in parallel with an anode of each connected to a cathode of the other, or each include parallel circuits in which a pair of transistors with short circuits created between a gates and sources thereof are connected in opposite orientations to each other.

5. A liquid crystal display panel, comprising:
an array substrate in which pixels are constituted by disposing a pixel electrode and a thin film transistor in each area enclosed by scan lines and picture lines arrayed as a matrix, and
a color filter substrate equipped with a common electrode;
wherein an inner shorting line that is thicker than the scan lines and picture lines is disposed so as to surround the periphery of a display area included in the liquid crystal display panel,
wherein the scan lines are each connected to first electrostatic prevention circuits and are bundled by a first shorting wire,
wherein the first shorting wire is connected to the inner shorting line via at least one second electrostatic prevention circuit,
wherein a common potential line that is thicker than the inner shorting line is disposed around the outer periphery of the inner shorting line,
wherein at least one group of multiple contact holes parallel with the common potential line is provided on an insulator provided over the inner shorting line,
wherein at least one group of multiple contact holes parallel with the inner shorting line is provided on an insulator provided over the common potential line, and
wherein the inner shorting line and common potential lines are electrically connected by the contact holes and by conductive films provided over the insulators.

6. The liquid crystal display panel according to claim 5, wherein the contact holes are slits that extend in parallel with the inner shorting line or the common potential line.

7. The liquid crystal display panel according to claim 5, wherein the picture lines are each connected to third electrostatic protection circuits and are bundled by a second shorting wire, the second shorting wire being connected to the inner shorting line via fourth electrostatic prevention circuits.

8. The liquid crystal display panel according to claim 5, wherein the first and second electrostatic prevention circuits each include a pair of diodes connected in parallel with an anode of each connected to a cathode of the other, or each include parallel circuits in which a pair of transistors with short circuits created between gates and sources thereof are connected in opposite orientations to each other.

9. The liquid crystal display panel according to claim 7, wherein the third and fourth electrostatic prevention circuits each include a pair of diodes connected in parallel with an anode of each connected to a cathode of the other, or each include parallel circuits in which a pair of transistors with short circuits created between gates and sources thereof are connected in opposite orientations to each other.

* * * * *